(12) United States Patent
von Mayenburg et al.

(10) Patent No.: US 7,000,996 B2
(45) Date of Patent: Feb. 21, 2006

(54) DIAGONAL PARKING BRAKE ACTIVATION FOR VEHICLES WITH PLURAL AXLES

(75) Inventors: Michael von Mayenburg, Lake Oswego, OR (US); Anthony P. Moore, Portland, OR (US)

(73) Assignee: Freightliner LLC, Portland, OR (US)

( * ) Notice: Subject to any disclaimer, the term of this patent is extended or adjusted under 35 U.S.C. 154(b) by 97 days.

(21) Appl. No.: 10/189,081

(22) Filed: Jul. 3, 2002

(65) Prior Publication Data

US 2003/0085616 A1 May 8, 2003

Related U.S. Application Data

(60) Provisional application No. 60/338,217, filed on Nov. 8, 2001.

(51) Int. Cl.
*B60T 13/00* (2006.01)

(52) U.S. Cl. .................................. 303/9.62; 303/123
(58) Field of Classification Search ............... 303/20, 303/198, 22.1, 7, 9, 9.61, 9.62, 9.66, 9.63, 303/2, 3, 15, 17, 123; 188/195, 1.11 E
See application file for complete search history.

(56) References Cited

U.S. PATENT DOCUMENTS

| | | | |
|---|---|---|---|
| 3,942,845 A | 3/1976 | Levering | |
| 4,040,507 A | 8/1977 | Reise | |
| 4,130,323 A | 12/1978 | Rajput et al. | |
| 4,863,221 A | 9/1989 | McNinch, Jr. | |
| 5,255,962 A | 10/1993 | Neuhaus et al. | |
| 5,615,931 A | 4/1997 | Stumpe et al. | |
| 5,701,974 A * | 12/1997 | Kanjo et al. ........... | 188/1.11 R |
| 5,829,846 A | 11/1998 | Zeiner et al. | |
| 5,979,612 A | 11/1999 | Reid | |
| 6,030,054 A | 2/2000 | Doericht | |
| 6,299,261 B1 * | 10/2001 | Weiberle et al. .......... | 303/20 |
| 6,311,808 B1 | 11/2001 | Halasy-Wimmer et al. | |
| 6,312,065 B1 | 11/2001 | Freitag et al. | |
| 6,322,159 B1 | 11/2001 | Eberling | |
| 6,357,836 B1 | 3/2002 | Schmitt et al. | |
| 6,447,075 B1 * | 9/2002 | Ross et al. .................... | 303/20 |
| 6,505,893 B1 | 1/2003 | Schmidt et al. | |

FOREIGN PATENT DOCUMENTS

| GB | 2286232 | * | 8/1995 |
|---|---|---|---|
| JP | 62-39346 | | 2/1987 |

* cited by examiner

*Primary Examiner*—Melanie Torres
(74) *Attorney, Agent, or Firm*—Klarquist Sparkman LLP

(57) ABSTRACT

The parking brakes on a truck or other vehicle having plural axles are applied such that at least one wheel at a first end of a first axle receives a parking brake force without applying a parking brake force to any wheel at the opposite end of the first axle. In addition, at least one wheel at a second end of a second axle, the second end of the second axle being opposite to the first end of the first axle, receives a parking brake force. Desirably, any wheels at the opposite end of the second axle from the second end of the second axle are not the recipient of a parking brake force such that diagonally disposed parking brake forces are applied upon activation of the vehicle parking brakes. The first axle in one example is forwardly of the second axle and the first end of the first axle may be at the longitudinal side of the vehicle which is the heaviest.

19 Claims, 3 Drawing Sheets

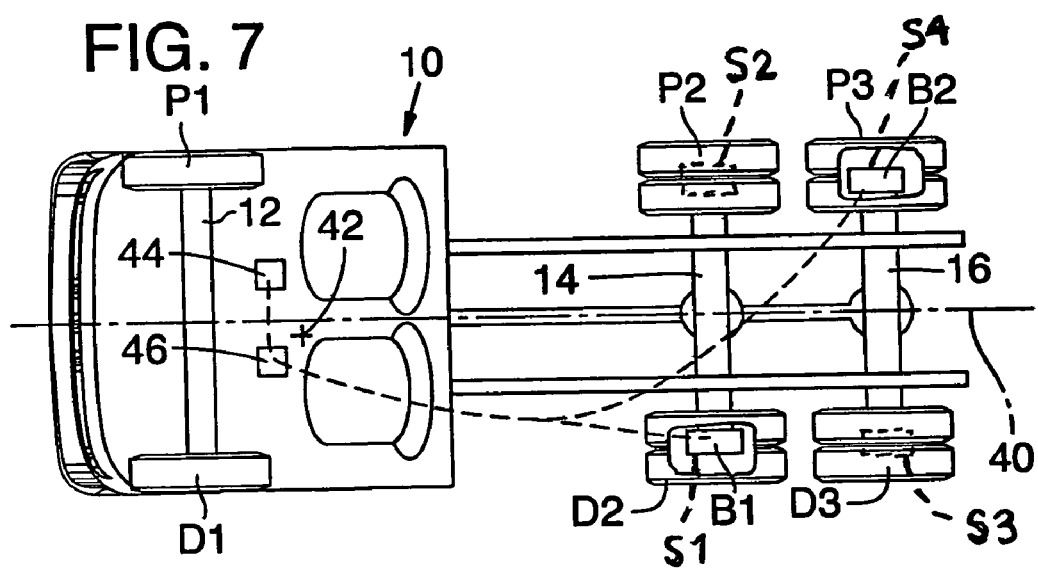

DIAGONAL PARKING BRAKE ACTIVATION FOR VEHICLES WITH PLURAL AXLES

CROSS REFERENCE

This application is based on provisional patent application No. 60/338,217, filed on Nov. 8, 2001. The entire disclosure of the provisional application is considered to be part of the disclosure of the following application and is hereby incorporated by reference herein.

BACKGROUND

FIG. 1 shows a truck tractor or other vehicle 10 having a front axle 12. A driver's side wheel coupled to front axle 12 is indicated at D1 while a passenger side wheel coupled to axle 12 is indicated at P1. Note: The designations D and P are for convenience only as the vehicle may be a left hand drive vehicle or a right hand drive vehicle. Truck or other vehicle 10 has tandem rear axles 14,16. Axle 14 has wheels D2 and P2 coupled thereto. Axle 16 has wheels D3 and P3 coupled thereto. More than one wheel may be coupled to each end of the axles. As is conventional, if two wheels are mounted to an end of an axle, the wheels are typically mounted by the same lug nuts and rotate together. These wheels are thus braked together if a parking brake is located in association with these wheels.

It is common for trucks to include parking brakes. Spring loaded cylinder actuated parking brakes are a specific example. For example, the brakes may be released by filling a cylinder with pressurized air in response to a control signal, such as an electronically delivered or mechanically delivered control signal. In contrast, air may be bled from the cylinder to set the brake. In another common approach, a two compartment brake actuator may be used to brake a wheel at the end of an axle (or plural wheels if more than one wheel is at the end of the axle). For example, the service brake is applied by pushing a brake pedal in the cab of the vehicle. In response to the application of the brake pedal, pressurized air is supplied to one compartment of the actuator resulting in the application of the brake at the wheel. Simultaneously, the other brakes (at other wheels) are applied in this service brake application mode. In this example, the parking brake is applied by operating a parking brake control, such as by moving a lever. In response, air is bled from another compartment of the actuator. This allows a spring to apply the brake of the wheel in a parking brake application mode. Simultaneously, the other brakes (at other wheels) are applied in this parking brake mode. Other forms of parking brake application mechanisms may alternatively be used.

FIGS. 1, 2 and 3 illustrate common known approaches for parking brakes. In FIG. 1, the parking brakes are located at the wheels coupled to the frontmost rear axle 14 (wheels D2 and P2). In FIG. 2, the parking brakes are located at the wheels coupled to the rearmost axle 16. Typically, both axles 14 and 16 are drive axles. As shown in FIG. 3, another known approach involves having parking brakes at wheels (P2 and D2) coupled to the frontmost axle 14 of rear axles 14,16 together with parking brakes at wheels (P3 and D3) coupled to the rearmost axle 16. The location of the parking brakes is indicated schematically in FIGS. 1–3 by shading in the wheels that have associated parking brakes.

Thus, in the known approaches, if one wheel has a parking brake, a directly opposed wheel on the same axle will have a parking brake. In addition, the parking brakes are operated together. Thus, in FIG. 1, wheels P2 and D2 are both braked when the parking brakes are applied. In FIG. 2, wheels P3 and D3 are both braked when the parking brakes are applied. In addition, in FIG. 3, all four wheels P2, D2, and P3, D3 are braked when the parking brakes are applied.

This approach can lead to some disadvantages.

For example, it is common for vehicles to have air suspension systems for leveling the vehicle. Assume in FIG. 6 that the parking brakes are located only at the rearmost axle 16 (e.g., at wheels P3,D3) in FIG. 6. If the vehicle happens to be parked with the rear wheels at a lower elevation (for example with the rear wheels P3,D3 off the pavement and the front wheels P2,D2 on the pavement) as illustrated in FIG. 6, it is possible for the effectiveness of the parking brakes to be hampered. In this example, the leveling system over time may attempt to raise the rear axle 16 to level the frontmost and rearmost axles 14,16 of the tandem pair. This can result in the rear wheels being lifted off of the ground (if the difference in elevation between the front and rear wheels is great enough) or unloaded enough such that the parking brakes no longer as effectively hold the truck in a parked position. If the truck is on a sufficient incline, movement of the truck is possible.

The present invention relates to all novel and non-obvious features and methods disclosed herein, both alone and in various combinations and sub-combinations with one another, as set forth in the claims below. The invention is not limited to a system which overcomes all of the disadvantages of the prior art. In addition, the invention may be implemented using conventional parking brakes as well as with parking brakes which are developed in the future.

SUMMARY

In accordance with one aspect of an embodiment relating to a method of applying parking brakes of a vehicle, a first parking brake is applied to brake at least one wheel attached to a first end portion of a first axle at one side of the vehicle without applying a parking brake to any wheel at the second end portion of the first axle which is opposite to the first end portion of the first axle. In addition, a second parking brake is applied to at least one wheel attached to a second end portion of a second axle at a second side of the vehicle opposite to the first side of the vehicle. As another aspect of an embodiment, the second parking brake may be applied without applying a parking brake to any wheel at a first end portion of the second axle which is opposite to the second end portion of the second axle.

As another aspect of an embodiment, the first and second axles may comprise a tandem pair of axles.

As a further aspect of an embodiment, the first and second parking brakes may be the only parking brakes on the vehicle.

As another aspect of an embodiment, there may be at least two wheels attached to the first end portion of the first axle and at least two wheels attached to the second end portion of the second axle. Typically, if plural wheels are at one end of an axle, there will be plural wheels at the other end of the axle as well. In this embodiment, application of the first parking brake results in braking of all of the wheels attached to the first end portion of the first axle. In addition, application of the second parking brake results in braking of all of the wheels attached to the second end portion of the second axle.

Desirably, the first and second parking brakes are simultaneously applied in these embodiments.

As another embodiment, a vehicle may be moved to a location where it is to be parked. In addition, only parking brakes at diagonally disposed wheels are applied in accordance with this embodiment. By diagonally disposed it is meant, the parking brake or brakes at one or more wheels at one end of a first axle and the parking brake or brakes at one or more wheels at the opposite end of a second axle, the first and second axles being a set of tandem axles. In this embodiment, if other parking brakes exist at other wheels of the vehicle, they are simply not applied in this specific embodiment.

As yet another embodiment of a method, only first and second parking brakes are applied with the first parking brake being applied to at least one first wheel mounted to one of a first and second axles and a second parking brake being applied to at least one second wheel of the other of a first and second axles, the second wheel being at the opposite side of the longitudinal axis of the vehicle from the first wheel.

As another aspect of an embodiment, the first axle may be forward of the second axle with the first wheel being located at the side of the longitudinal axis of the vehicle which is heaviest when the vehicle is unloaded and the second axle being located at the side of the longitudinal axis of the vehicle which is lightest when the vehicle is unloaded.

As another aspect of an embodiment, a method of applying parking brake forces to a moving vehicle comprises applying a parking brake force at a first location at one side of a vehicle corresponding to the heaviest side of the unloaded vehicle, applying a parking brake force at a second location at a second side of the vehicle corresponding to the lightest side of the unloaded vehicle, wherein the first location is forwardly of the second location and wherein the parking brake forces are only applied at the first and second locations. In accordance with an embodiment, a determination is made of the side of an unloaded vehicle at which the center of gravity of the unloaded vehicle is located relative to the longitudinal centerline of the vehicle. This determination may be made at any one or more times such as when the vehicle is being designed or during vehicle manufacture. The determination can be made by empirical observations, by weighing the vehicle, or by observing which side of the longitudinal centerline of the vehicle has the heaviest vehicle components. In accordance with this embodiment, first and second braking forces are applied to respective first and second wheels at opposite sides of the vehicle with the first and second wheels being at different distances from the front of the vehicle. The first and second wheels are selected so as to reduce the tendency of the vehicle to travel other than in a first direction of vehicle travel upon the application of braking forces to the vehicle traveling in the first direction, this tendency arising as a result of a vehicle having a center of gravity which is located away from the longitudinal centerline of the vehicle. Desirably, these braking forces result from the application of the vehicle parking brakes.

Embodiments of vehicles with parking brake configurations and systems to implement the above described methods are also disclosed and claimed.

DESCRIPTION OF THE DRAWINGS

FIG. 7 is a schematic illustration of a truck or other vehicle with a parking brake system in accordance with one embodiment.

DETAILED DESCRIPTION

Figure 1:
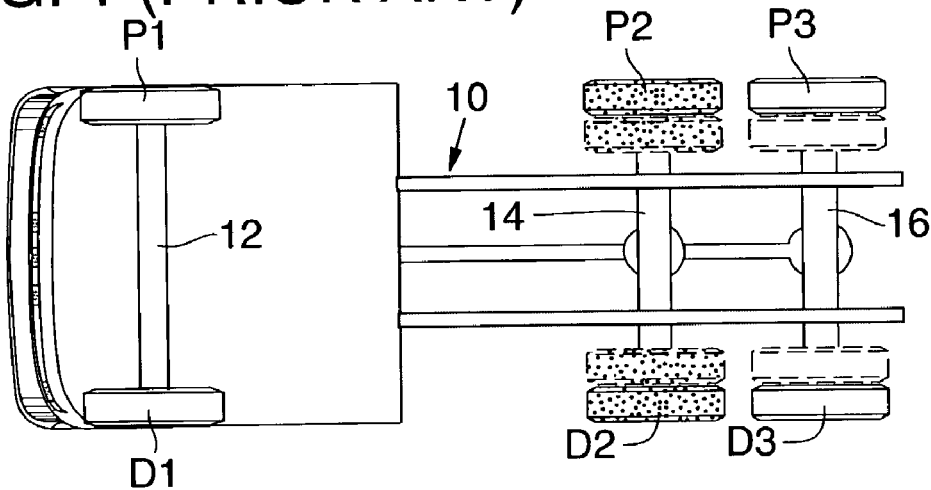
FIG. 1 is a schematic illustration of a truck or other vehicle having parking brakes at the wheels at the opposite ends of a forward axle of a tandem axle pair and wherein, in accordance with the prior art, the parking brakes are activated together.
Figure 2:
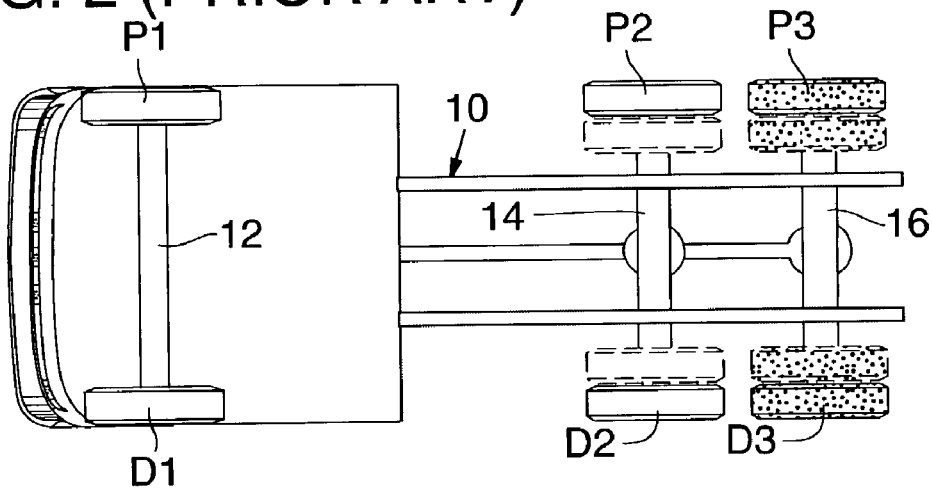
FIG. 2 is a schematic illustration of a truck or other vehicle having parking brakes at the opposite wheels of the rearmost axle of a tandem axle pair and wherein, in accordance with the prior art, the parking brakes are operated together.
Figure 3:
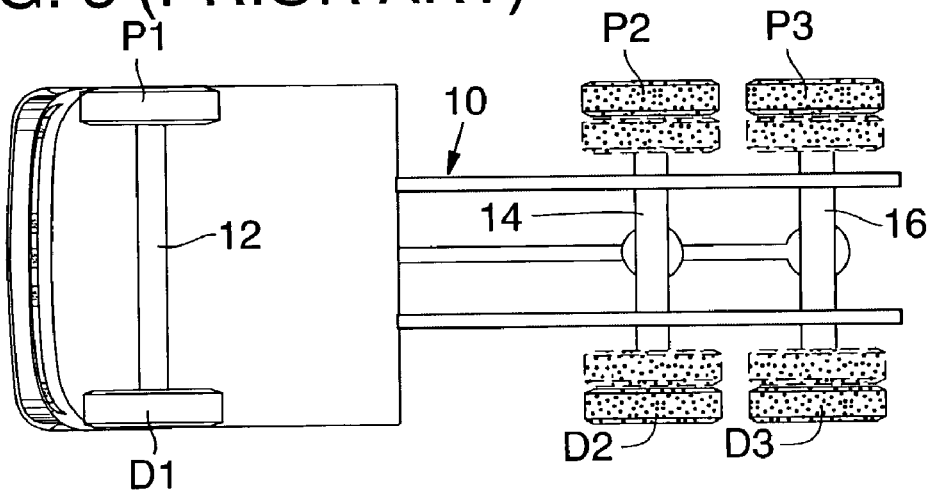
FIG. 3 is a schematic illustration of a truck or other vehicle having parking brakes at the opposite ends of a forward axle of a tandem axle pair and at the wheels at the opposite end of a rearmost axle of the tandem axle pair, and wherein, in accordance with the prior art, all of the parking brakes are activated together.
Figure 4:
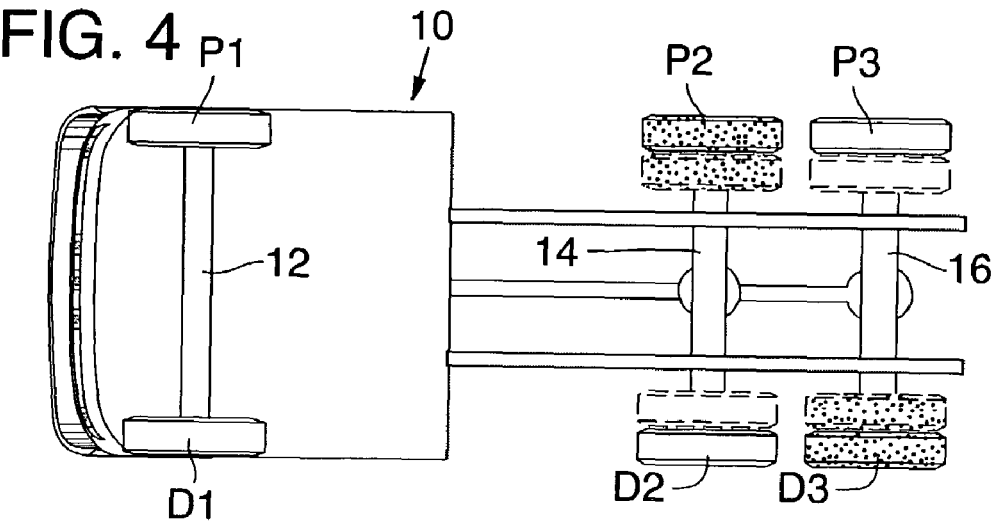
FIG. 4 is a schematic illustration of a truck or other vehicle having two rear axles and with diagonally disposed parking brakes.
Figure 5:
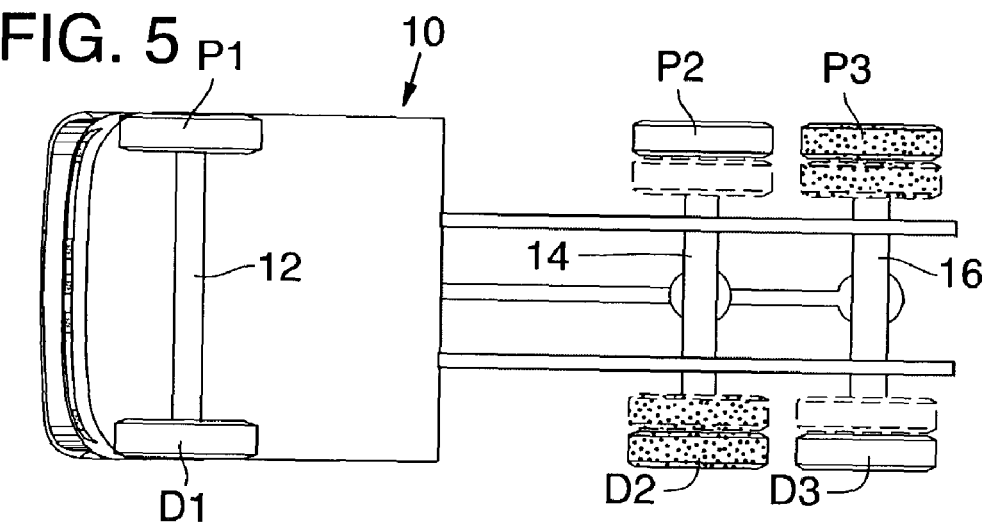
FIG. 5 is a schematic illustration of a truck or other vehicle similar to that shown in FIG. 4 but with diagonally disposed parking brakes at the opposite ends of the axles 14,16 from the depiction in FIG. 4.

FIG. 4 illustrates an approach in accordance with one exemplary embodiment of the present invention. In this approach, the parking brakes are situated on diagonally disposed wheels instead of upon directly opposed wheels. Specifically, the parking brakes are present on wheels D3 and P2 in FIG. 4. In FIG. 5, an alternative embodiment, the parking brakes are positioned on diagonally opposed wheels D2 and P3. That is, the parking brakes are on at least one wheel at one end of a first axle of a tandem axle pair and on at least one wheel at the opposite end of a second axle of the tandem axle pair.

Figure 6:
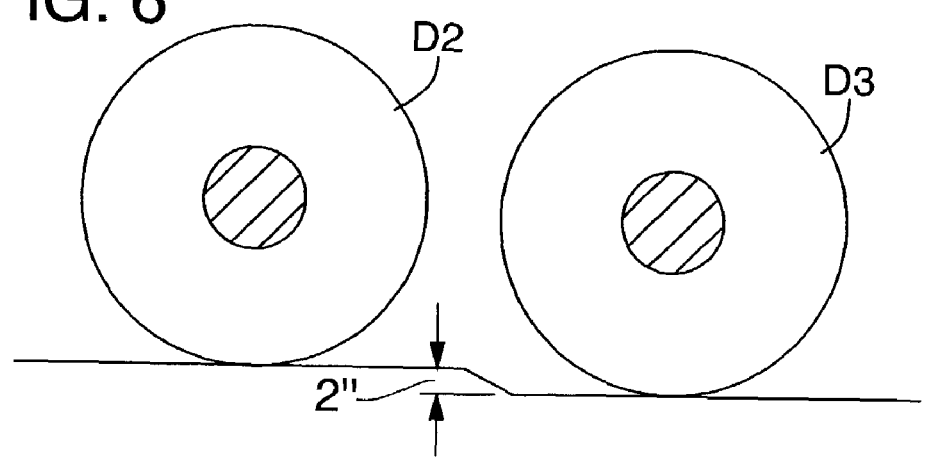
FIG. 6 is a schematic illustration of two wheels of a vehicle, such as a truck, having parking brakes such as, for example, shown in FIG. 4 or FIG. 5.

If a vehicle has the parking brake configuration of either the FIG. 4 or FIG. 5 embodiments and if the vehicle is in the FIG. 6 situation, once the parking brakes are set, since at least one of the wheels on the elevated surface of the slope will have a parking brake engaged, the truck will remain in place even if the rear wheels are lifted to level the front and rear axles 14,16 of the rearmost tandem pair. Thus in FIG. 4 and 5, diagonally applied parking braking forces are applied. That is, in this example, at least one wheel at one end of a first rear axle has a parking brake force applied and at least one wheel at the opposite end of a second rear axle has a parking brake force applied.

Although less desirable, parking brakes can be located at least at one wheel at each end of axle 14 and only at one or more wheels at only one end of axle 16. In addition, in a less desirable alternative, parking brakes can be located at least at one wheel at each end of the rear axle 16 of the vehicle and only at one or more wheels at one end of a first axle. In addition, the parking brakes may be applied to at least one wheel at each end of a second axle or only to at least one wheel at a second end of the second axle at the opposite side of the vehicle from the end of the first axle at which a parking brake force is applied.

Parking brakes may be located at all of the wheels of the vehicle but operated such that during selected conditions, not all of the parking brakes are applied. For example, diagonally disposed parking brakes may be operated. Alternatively, all of the parking brakes may be operated under such conditions except the parking brakes at one end of one axle. These conditions may be, for example, when the vehicle is parked or when the vehicle is travelling along a roadway.

The embodiment of FIG. 5 is also advantageous if one is traveling down the road and the parking brakes are applied. In this situation, the vehicle (e.g., a truck tractor without a trailer) has greater stability. That is, the passenger's side of a U.S. vehicle is typically somewhat lighter than the driver's side (e.g., because of the position of a turbocharger in a typical truck). Consequently, if the parking brakes are located only on directly opposed wheels, the vehicle tends to turn to the left (which can be compensated for by the driver) when the parking brakes are applied because more of the vehicle weight is located at the left (driver's side) of the longitudinal centerline of the vehicle. With the embodiment shown in FIG. 5, because the parking brake on wheel D2 is closer to the front of the vehicle (at the side where the engine turbo charger is located than the parking brake at wheel P3) more of a moment arm is present to resist the motion of the truck to the left. In countries where the driver's side of the vehicle is opposite and where the weight of the vehicle is heavier at that location, the embodiment of FIG. 4 offers the greatest resistance to this tendency for the vehicle to turn upon the application of the parking brake.

Thus, in accordance with a method, one can determine which side of the longitudinal centerline of an unloaded vehicle has the greatest weight and position and/or apply the parking brake on at least one wheel of the front axle of the tandem axle pair at that side of the vehicle. In contrast, the parking brake can be positioned and/or applied on at least one wheel of the rearmost axle of the tandem axle pair on the opposite side of the vehicle. Alternatively, and less desirably, parking brakes can be positioned on at least one wheel at each end of the rearmost axle 16 and on at least one wheel at the forward axle 14 which is located at the side of the vehicle which is heaviest.

FIG. 7 illustrates a track tractor 10 with a front axle 12 with wheels P1, D1 at the respective first and second sides of a longitudinal centerline 40 of the vehicle. The tractor 10 also has rear axles 14,16 (axle 14 being forwardly of axle 16). The axles 14,16 are two axles of a tandem axle pair. Axle 14 has two wheels (one of which is designated P2) at the first side of the vehicle and two wheels (one of which is designated D2) at the second side of the vehicle. Similarly, axle 16 has two wheels at the first side of the vehicle (one of which is designated P3) and two wheels at the second side of the vehicle (one of which is designated D3). Respective first and second parking brakes are shown in the embodiment of FIG. 7. The first parking brake is designated B1 and is located to brake the wheels D2 of axle 14. The second parking brake is designated B2 and is located to brake the wheels P3 of axle 16. When a parking brake actuator such as a lever 44 is shifted by a vehicle operator or otherwise controlled to apply the parking brakes, a controller 46 delivers parking brake application signals resulting in the application of the parking brakes B1 and B2. Alternatively, the lever may be mechanically connected to the brakes B1 and B2. In one specific approach, when the parking brakes are operated, valves at B1 and B2 are controlled to bleed air from a compartment of a brake actuator. This allows a spring or other biasing mechanism to apply the parking brakes at the wheels P3 and D2. If a brake pedal (not shown) or other applicator is operated to apply the service brakes of the vehicle, in this example, valves are controlled to supply pressurized air to one compartment of a brake actuator at brake B1 and also at brake B2. The application of pressurized air to this compartment of the actuator results in the application of the service brakes. Service brakes for the wheels D2, P2, P3 and D3 are respectively indicated schematically by the dashed line designations S1, S2, S3 and S4 in FIG. 7. The parking brake application system is not limited to a specific type of parking brake applicator or parking brake actuator. A system is suitable when operable to apply parking brakes in the desirable manner of the embodiments described above.

Having illustrated and described the principles of our invention with reference to several examples, which do not limit the scope of the invention, our invention relates to all novel and non-obvious features and methods disclosed herein, alone and/or in combination with one another.

We claim:

1. A vehicle comprising at least two rear axles, the first of said axles being forwardly of a second of said axles, first and second axles each having respective first and second end portions, the first end portions of the first and second axles being at one side of the longitudinal axis of the vehicle and the second end portions of the first and second axles being at the other side of the longitudinal axis, at least one wheel coupled to each end portion of each of the first and second axles, service brakes adapted to apply wheel service braking forces, at least one first parking brake adapted to apply a first parking brake force to the at least one wheel at the first end portion of the first axle, at least one second parking brake adapted to apply a second parking brake force to the at least one wheel at the second end portion of the second axle, and a parking brake controller adapted to selectively apply only the first and second parking brakes whether or not the service brakes are being applied.

2. A vehicle according to claim 1 wherein there are at least two wheels coupled to each end portion of each of the first and second axles, and wherein there is a first parking brake for the two wheels at the first end portion of the first axle and a second parking brake for the two wheels at the second end portion of the second axle.

3. A vehicle according to claim 2 in which the only parking brakes at the first and second axles are the respective first and second parking brakes.

4. A vehicle according to claim 3 in which the vehicle has a driver's side and a passenger's side and in which the first end portion of the first axle is at the driver's side of the vehicle.

5. A vehicle according to claim 3 in which the center of gravity of the unloaded vehicle is at a first side of the longitudinal axis of the vehicle, and wherein the first end portion of the first axle is at the same side of the longitudinal axis of the vehicle as the center of gravity of the unloaded vehicle.

6. A vehicle comprising first and second rear axles, each of the axles having respective first and second end portions, the first end portions of the first and second axles being at one side of the vehicle and the second end portions of the first and second axles being at the opposite side of the vehicle from the first end portions, at least one wheel being provided at each end portion of the first axle and at least one wheel being provided at each end portion of the second axle, a first parking brake at at least one wheel at the first end portion of the first axle and a second parking brake at at least one wheel at the second end portion of the second axle, and a parking brake applicator operable to selectively apply the first parking brake at a wheel at the first end portion of the first axle and the second parking brake at a wheel at the second end portion of the second axle without applying at least one other parking brake at either the second end portion of the first axle or the first end portion of the second axle and without first requiring the application of any other brakes on the vehicle.

7. A vehicle comprising service brakes and first and second rear axles, each of the axles having respective first and second end portions, the first end portions of the first and second axles being at one side of the vehicle and the second end portions of the first and second axles being at the opposite side of the vehicle from the first end portions, at least one wheel being provided at each end portion of the first axle and at least one wheel being provided at each end portion of the second axle, service brakes adapted to apply service braking forces to wheels of the vehicle, a first parking brake at at least one wheel at the first end portion of the first axle and a second parking brake at at least one wheel at the second end portion of the second axle, and a parking brake applicator operable to selectively apply the first parking brake at a wheel at the first end portion of the first axle and the second parking brake at a wheel at the second end portion of the second axle the parking brake applicator being operable to selectively apply the first and second parking brakes without first requiring the application of the service brakes; and
    wherein the parking brake applicator is operable to selectively apply the second parking brake without applying any parking brakes which may exist at the second end portion of the first axle and at the first end portion of the second axle.

8. A vehicle according to claim 7 wherein the first axle is forwardly of the second axle and the first end portion of the first axle is at the driver's side of the vehicle.

9. A vehicle according to claim 7 wherein the first axle is forwardly of the second axle and wherein the first end portion of the first axle is at the side of the vehicle which is heaviest when the vehicle is unloaded.

10. A vehicle comprising first and second rear axles, each of the axles having respective first and second end portions, the first end portions of the first and second axles being at one side of the vehicle and the second end portions of the first and second axles being at the opposite side of the vehicle from the first end portions, at least one wheel being provided at each end portion of the first axle and at least one wheel being provided at each end portion of the second axle, a first parking brake at at least one wheel at the first end portion of the first axle and a second parking brake at at least one wheel at the second end portion of the second axle, and a parking brake applicator operable to selectively apply the first parking brake at a wheel at the first end portion of the first axle and the second parking brake at a wheel at the second end portion of the second axle; and
    wherein there are no parking brakes at the second end portion of the first axle and there are no parking brakes at the first end portion of the second axle.

11. A vehicle comprising first and second rear axles, each of the axles having respective first and second end portions, the first end portions of the first and second axles being at one side of the vehicle and the second end portions of the first and second axles being at the opposite side of the vehicle from the first end portions, at least one wheel being provided at each end portion of the first axle and at least one wheel being provided at each end portion of the second axle, service brakes adapted to apply service braking forces to wheels of the vehicle, a first parking brake at at least one wheel at the first end portion of the first axle and a second parking brake at at least one wheel at the second end portion of the second axle, and a parking brake applicator operable to selectively apply the first parking brake at a wheel at the first end portion of the first axle and the second parking brake at a wheel at the second end portion of the second axle; and
    in which the parking brake applicator is selectively operable to only apply diagonally disposed parking brake forces at the respective first and second end portions of the respective first and second axles.

12. A vehicle having a longitudinal centerline and comprising at least first and second rear axles, each axle having a respective first and second end portion, the first end portions of each axle being at a first side of the centerline of the vehicle, the second end portions of each axle being at a second side of the centerline of the vehicle opposite to the first side, at least one wheel coupled to the first end portion of the first axle, at least one wheel coupled to the second end portion of the first axle, at least one wheel coupled to the first end portion of the second axle, at least one wheel coupled to the second end portion of the second axle, service brake adapted to selectively apply service braking forces to wheels of the vehicle, and a parking brake system operable to selectively apply a parking brake force to at least one wheel at the first end portion of the first axle without a parking brake force being applied to any wheel at the second end portion of the first axle and to apply a parking brake force to at least one wheel at the second end portion of the second axle, the parking brake system being operable without preventing the application of service braking forces to any of the wheels of the vehicle provided with service brakes.

13. A vehicle according to claim 12 wherein the first axle is forwardly of the second axle.

14. A vehicle according to claim 12 wherein the first axle is rearwardly of the second axle.

15. A vehicle according to claim 12 wherein the first and second axles are a set of tandem axles at the rear of the vehicle.

16. A vehicle having a longitudinal centerline and comprising at least first and second rear axles, each axle having a respective first and second end portion, the first end portions of each axle being at a first side of the centerline of the vehicle, the second end portions of each axle being at a second side of the centerline of the vehicle opposite to the first side, at least one wheel coupled to the first end portion of the first axle, at least one wheel coupled to the second end portion of the first axle, at least one wheel coupled to the first end portion of the second axle, at least one wheel coupled to the second end portion of the second axle, service brakes and a parking brake system operable to selectively apply a parking brake force to at least one wheel at the first end portion of the first axle without a parking brake force being applied to any wheel at the second end portion of the first axle and to apply a parking brake force to at least one wheel at the second end portion of the second axle; and
    in which the parking brake system is operable to apply a parking brake force to at least one wheel at the second end of the second axle without applying a parking brake force to any wheel at the first end of the second axle.

17. A vehicle according to claim 16 wherein the first axle is forwardly of the second axle.

18. A vehicle according to claim 16 wherein the first axle is rearwardly of the second axle.

19. A vehicle according to claim 16 wherein the first and second axles are a set of tandem axles at the rear of the vehicle.

* * * * *